(12) United States Patent
Boorse et al.

(10) Patent No.: US 9,475,002 B2
(45) Date of Patent: Oct. 25, 2016

(54) PARTIAL FILTER SUBSTRATES CONTAINING SCR CATALYSTS AND METHODS AND EMISSIONS TREATMENT SYSTEMS

(75) Inventors: R. Samuel Boorse, Skillman, NJ (US); Kenneth E. Voss, Somerville, NJ (US); Martin Dieterle, Jersey City, NJ (US)

(73) Assignee: BASF Corporation, Florham Park, NJ (US)

( * ) Notice: Subject to any disclaimer, the term of this patent is extended or adjusted under 35 U.S.C. 154(b) by 501 days.

(21) Appl. No.: 12/765,441

(22) Filed: Apr. 22, 2010

(65) Prior Publication Data

US 2010/0269491 A1    Oct. 28, 2010

Related U.S. Application Data

(60) Provisional application No. 61/171,567, filed on Apr. 22, 2009.

(51) Int. Cl.
| | |
|---|---|
| *B01D 53/94* | (2006.01) |
| *F01N 3/022* | (2006.01) |
| *F01N 3/035* | (2006.01) |
| *F01N 3/20* | (2006.01) |

(52) U.S. Cl.
CPC ......... *B01D 53/9431* (2013.01); *B01D 53/944* (2013.01); *B01D 53/9477* (2013.01); *F01N 3/022* (2013.01); *F01N 3/035* (2013.01); *F01N 3/2066* (2013.01); *B01D 2255/20738* (2013.01); *B01D 2255/502* (2013.01); *B01D 2255/915* (2013.01); *B01D 2257/404* (2013.01); *B01D 2258/012* (2013.01); *F01N 2250/02* (2013.01); *F01N 2330/02* (2013.01); *F01N 2330/22* (2013.01); *Y02T 10/24* (2013.01)

(58) Field of Classification Search
None
See application file for complete search history.

(56) References Cited

U.S. PATENT DOCUMENTS

| | | | | |
|---|---|---|---|---|
| 3,111,396 | A | * 11/1963 | Ball | B01D 39/20 264/628 |
| 4,329,162 | A | 5/1982 | Pitcher, Jr. | |
| 4,961,917 | A | * 10/1990 | Byrne | 423/239.2 |
| 5,100,632 | A | 3/1992 | Dettling et al. | |
| 5,120,695 | A | 6/1992 | Blumrich et al. | |

(Continued)

FOREIGN PATENT DOCUMENTS

| | | |
|---|---|---|
| DE | 102004040548 A1 | 2/2006 |
| EP | 0798452 A1 | 10/1997 |

(Continued)

OTHER PUBLICATIONS

PCT International Search Report, dated Jul. 23, 2010.

(Continued)

*Primary Examiner* — Sarah A Slifka
(74) *Attorney, Agent, or Firm* — Womble Carlyle Sandridge & Rice, LLP (57) ABSTRACT

Catalytic articles, methods and emissions treatment systems for treating an engine exhaust gas stream containing $NO_x$ and particulate matter are disclosed and include a particulate filter comprising a first SCR catalyst for $NO_x$ conversion disposed downstream of the injector. The particulate filter is a partial filter with a particle filtration efficiency between about 30% and 60% and an SCR catalyst loading in the range of 0.1 $g/in^3$-3.5 $g/in^3$.

22 Claims, 4 Drawing Sheets

(56) References Cited

U.S. PATENT DOCUMENTS

| | | |
|---|---|---|
| 5,462,907 A | 10/1995 | Farrauto et al. |
| 5,491,120 A | 2/1996 | Voss et al. |
| 5,516,497 A | 5/1996 | Speronello et al. |
| 2004/0098980 A1 | 5/2004 | Montreuil et al. |
| 2005/0031514 A1* | 2/2005 | Patchett ............... B01D 5/0054 423/239.2 |
| 2006/0039843 A1 | 2/2006 | Patchett et al. |
| 2006/0236684 A1 | 10/2006 | Zhang et al. |
| 2008/0132405 A1 | 6/2008 | Patchett et al. |

FOREIGN PATENT DOCUMENTS

| | | |
|---|---|---|
| EP | 1961933 A1 | 8/2008 |
| WO | WO-99/39809 | 8/1999 |
| WO | 2004050219 A1 | 6/2004 |
| WO | 2005099867 A1 | 10/2005 |
| WO | 2010075345 A2 | 7/2010 |

OTHER PUBLICATIONS

Non-Final Office Action in U.S. Appl. No. 12/643,621, mailed Mar. 16, 2012, 20 pgs.

* cited by examiner

PARTIAL FILTER SUBSTRATES CONTAINING SCR CATALYSTS AND METHODS AND EMISSIONS TREATMENT SYSTEMS

CROSS-REFERENCE TO RELATED APPLICATIONS

This application claims priority under 35 U.S.C. §119 (e) to U.S. Patent Application Ser. No. 61/171,567, filed Apr. 22, 2009, which is hereby incorporated by reference in its entirety.

BACKGROUND

The present invention relates to a catalytic article, methods and systems for treating typical gaseous emissions of diesel engines before they are allowed to enter the atmosphere. The system includes a partial filter with a particle filtration efficiency which is generally lower than that of a wall flow filter.

Diesel engine exhaust is a heterogeneous mixture which contains not only gaseous emissions such as carbon monoxide (CO), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts ("DOC"), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) promote the oxidation of nitric oxide (NO) to $NO_2$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of the total particulate matter.

One aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus the accumulating particles have to be continuously or periodically burned out of the filter to maintain an acceptable back pressure.

Ammonia selective catalytic reduction (SCR) is a $NO_x$ abatement technology that will be used to meet strict $NO_x$ emission targets in diesel and lean-burn engines. In the ammonia SCR process, $NO_x$ (defined as the sum of $NO+NO_2$) is reacted with ammonia (or an ammonia precursor such as urea) to form dinitrogen ($N_2$) over a catalyst typically composed of base metals.

Catalyzed wall flow filters containing a catalyst that promotes SCR of $NO_x$ assume two functions: removal of the particulate component of the exhaust stream and conversion of the $NO_x$ component of the exhaust stream to $N_2$. SCR-coated wall flow filters that can achieve $NO_x$ reduction goals require a sufficient loading of SCR catalyst composition on the wall flow filter under the usual space constraints in a vehicle. The gradual loss of the catalytic effectiveness of the compositions that occurs over lifetime through exposure to certain deleterious components of the exhaust stream or high temperatures augments the need for higher catalyst loadings of the SCR catalyst composition. However, preparation of coated wall flow filters with higher catalyst loadings can lead to unacceptably high back pressure within the exhaust system. An increase in backpressure can have an adverse impact on fuel efficiency.

An additional aspect for consideration in coating the wall flow filter is the selection of the appropriate SCR catalyst composition. First, the catalyst composition must be thermally durable so that it maintains its SCR catalytic activity even after prolonged exposure to higher temperatures that are characteristic of filter regeneration. For example, combustion of the soot fraction of the particulate matter often leads to temperatures above 700° C. and higher. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the $NO_x$ component of the exhaust to achieve $NO_x$ reduction goals, even at lower exhaust temperatures, particularly when the SCR catalyst is disposed on a filter substrate such as a wall flow filter. In general the SCR catalyst should have a high specific activity combined with a high hydrothermally stability.

Wall flow filters containing SCR catalysts and coating techniques have been proposed that allow higher SCR catalyst loadings on the wall flow filter, yet still allow the filter to maintain flow characteristics that achieve acceptable back pressures. Despite such proposed wall flow filters and coating techniques having higher SCR catalyst loadings, it would be desirable to provide alternative catalyzed filters and systems that permit management of backpressure and the catalytic function of the SCR catalyst. In addition, it would be desirable to provide catalytic articles, systems and methods that utilize particulate filters coated with an SCR catalyst at a loading that also achieves sufficient lower temperature $NO_x$ conversion when the exhaust gas stream passes through the filter, as well as exhibiting desirable hydrothermal aging characteristics.

SUMMARY OF THE INVENTION

According to an aspect of the invention, partial efficiency filters are utilized in systems and methods for the abatement of diesel engine exhaust and the treatment of an engine exhaust gas stream containing $NO_x$ and particulate matter. Compliance with emissions guidelines, for example EU III and EU IV, may not require a high efficiency filter, and a partial efficiency filter may be utilized in systems that do not require high filtration efficiency. As used herein a "partial filter" or "partial efficiency filter" refers to a filter having a filter efficiency in the range of about 30% to about 60% by mass.

In addition, the use of partial efficiency soot filters (or "partial filters") in diesel exhaust applications provides additional exhaust treatment system design flexibility. For example, because the collection of soot in a partial filter occurs at a lower rate than a high efficiency filter, the time between needed regenerations is longer, thereby reducing the fuel consumption associated with raising the exhaust temperature to ensure complete burning of the soot and reducing the thermal load on the filter materials. Also, some partial filter designs allow fabrication from metals thereby increasing resistance of the filter to thermal and mechanical shock. This allows placement of the filter closer to the engine, where vibratory and exhaust pressure pulsation forces are much higher. Furthermore, partial filter designs do not have any blind or closed off channels, and therefore, are much less likely to collect the refractory inorganic byproducts of soot burning, namely ash, which build up in high efficiency filters with use. The ash build-up in high efficiency filters contributes to increased exhaust system backpressure and consequential lower engine efficiency. Thus, the avoidance of ash build-up with partial filters directly contributes to higher engine efficiency and lower fuel consumption. With these design consideration in mind, it is clear that applications in which can meet particulate emissions regulations with a partial filter have clear incentives to do so.

According to certain embodiments of the invention, the particulate filter is a partial filter which removes at least 30 to 60% of the particulate matter in the gas stream. Also, the particulate filter may have a porosity of between 50% and 95%. The particulate filter may include a foam. Such filters may further have an open or reticulated substrate structure and/or pores and struts providing cellular walls.

In another embodiment, the particulate filter has a catalyst loading in the range of 0.1 $g/in^3$-3.5 $g/in^3$ or, more specifically, in the range from about 0.5 $g/in^3$-2.0 $g/in^3$. In one or more embodiments, the SCR catalyst is disposed on along the axial length of the particulate filter. In certain embodiments, the SCR catalyst is disposed on a portion or a zone of the axial length of the particulate filter, which may occupy or extend less than the full axial length of the particulate filter.

According to other embodiments of the invention, the composition of the gas stream to be treated by the system is about 500 ppm NO, 500 ppm $NH_3$ and 5% water in air. The SCR catalyst used in such embodiments can be any material that provides or is effective for a $NO_x$ conversion of at least 10% at 250° C. and a space velocity of about 40,000 $h^{-1}$ with a NOx to $NH_3$ ratio of 1. Certain embodiments of the system produce a minimum targeted system $NO_x$ conversion of more than about 30% and a maximum targeted percentage increase in system back pressure of about 25% compared to an identical system with an identical uncoated filter. In a specific embodiment, the target system $NO_x$ conversion is about 60% over the test cycle and the maximum targeted percentage increase in back pressure in the filter is about 25% when compared to an identical system with an identical uncoated filter.

In various embodiments of the invention, the SCR catalyst may include a zeolite having a CHA structure, such as, for example, a Cu CHA structure. The SCR catalyst of one or more embodiments may include a mixed oxide of $V_2O_5$, $WO_3$ and $TiO_2$, and/or may include a Fe doped zeolite. In alternative embodiments, the SCR catalyst may include a molecular sieve, which may contain Cu, Fe, Mn, Co, Ag and combinations thereof.

There may be multiple SCR catalysts placed at different locations in the system which may be the same or different. If the two catalysts are different, the first SCR catalyst may be operable for $NO_x$ conversion at higher gas stream temperatures and the second SCR catalyst may be operable for $NO_x$ conversion at lower gas stream temperatures.

Systems including a particulate filter with an SCR catalyst may also incorporate one or more additional substrates, which may include SCR or oxidation catalysts. The SCR catalysts utilized with such additional substrates may be the same or different than the SCR catalyst utilized in the particulate filter. In one or more embodiments, an oxidation catalyst may be positioned upstream of the particulate filter. In a more specific embodiment of the system, a particulate filter may be disposed adjacent to the engine such that there is no intervening SCR catalyst between the particulate filter and the engine. The system may also include a particulate filter and a flow through substrate disposed downstream of the particulate filter, and may optionally include an oxidation catalyst disposed upstream of the particulate filter. In such systems, the flow through substrate may include a SCR catalyst effective for $NO_x$ conversion and the system may have a $NO_x$ conversion in the range of about 50% and 100%. In a more specific embodiment, the $NO_x$ conversion by the particulate filter is in the range of about 10% and 90% of the system total $NO_x$ conversion.

One or more embodiments of the systems described herein are operative to generate initial, intermediate and final NOx concentrations in the exhaust gas stream. In such embodiments, the system generates an intermediate NOx concentration after the exhaust gas stream passes through a particulate filter, and a final NOx concentration after the exhaust gas stream passes through a second substrate. In such systems, the system $NO_x$ conversion based on the initial $NO_x$ concentration and the final $NO_x$ concentration and an increase in system back pressure lies within an operational window based on a minimum targeted system $NO_x$ conversion and a maximum targeted percentage increase in system back pressure. In one or more embodiments, the target system NOx conversion is more than 50% and the maximum target percentage increase in system back pressure is about 25% compared to an identical system including an identical uncoated filter.

Furthermore, the invention includes a method of treating an engine exhaust gas stream having a $NO_x$ concentration, a system back pressure and a system $NO_x$ conversion. Such methods are effective for conversion of $NO_x$ and include defining an exhaust gas system operational window based on a minimum targeted system $NO_x$ conversion and a maximum targeted percentage increase in system back pressure, passing the gas stream through a particulate filter disposed downstream of the engine, injecting a reductant, such as ammonia or an ammonia precursor, into the gas stream upstream of the particulate filter, and passing the gas stream through a second substrate loaded with a second SCR catalyst disposed downstream of the particulate filter, wherein the system $NO_x$ conversion and the system back pressure are within the operational window. The gas stream exiting the emissions treatment system has a final $NO_x$ concentration. In one or more embodiments, the system $NO_x$ conversion is in the range of about 50% and 100%. The conversion of the particulate filter utilized in one or more embodiments of the methods described herein is in the range from about 10% to 90% of the system $NO_x$ conversion.

In a more specific embodiment, the gas stream is passed through a particulate filter having a particulate filtration efficiency in the range of about 30% and 60% by mass disposed downstream of the engine. In certain embodiments of the method, the particulate filter is a metal foam filter which has a porosity in the range of 60%-95%. In a particular embodiment of the method, the particulate filter loaded with a SCR catalyst has a loading effective for $NO_x$ conversion, for example, in the range of about 0.1 $g/in^3$ and 3.5 $g/in^3$. In an alternative embodiment, the SCR catalyst has a loading in the range of about 0.5 $g/in^3$ and 2.0 $g/in^3$. The SCR catalyst may be disposed on the filter substrate from 10 to 100% of its length.

In one or more embodiments of the method, the percentage increase in system back pressure is based on a comparison of system back pressure associated with a filter not loaded with catalyst to a system with a filter loaded with catalyst as measured by an average of cold flow values at a space velocity in the range of about 20,000 $hr^{-1}$ and 120,000 $hr^{-1}$. In one or more embodiments, the method does not incorporate an intervening SCR catalyst disposed between the engine and the particulate filter. In a more specific embodiment, the second substrate is loaded with a second SCR catalyst disposed downstream of the particulate filter effective for $NO_x$ conversion.

According to other embodiments of the method, the minimum targeted system $NO_x$ conversion is more than about 30% and the maximum targeted percentage increase in system back pressure is about 25% compared to an identical system with an identical uncoated filter. In a specific embodiment, the target system $NO_x$ conversion is about 50% over the test cycle and the maximum targeted percentage increase in back pressure in the filter is about 25% when compared to an identical system with an identical uncoated filter.

The foregoing has outlined rather broadly certain features and technical advantages of the present invention. It should be appreciated by those skilled in the art that the specific embodiments disclosed may be readily utilized as a basis for modifying or designing other structures or processes within the scope of the present invention. It should also be realized by those skilled in the art that such equivalent constructions do not depart from the spirit and scope of the invention as set forth in the appended claims.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Catalytic articles, systems and methods are provided including a partial efficiency filter that simultaneously treats the particulate matter, the $NO_x$ and other gaseous components of diesel engine exhaust. The emission treatment system uses an integrated soot filter and SCR catalyst to significantly minimize the weight and volume required for the emissions system. Moreover, due to the choice of catalytic compositions implemented in the system, effective pollutant abatement is provided for exhaust streams of varying temperatures. This feature is advantageous for operating diesel vehicles under varying loads and vehicle speeds which significantly impact exhaust temperatures emitted from the engines of such vehicles.

Integration of $NO_x$ reduction and particulate removal functions into a single catalyst article is accomplished using a partial filter substrate coated with an SCR catalyst composition. Achieving practical levels of SCR catalyst composition on the wall flow substrate is important for providing sufficient catalytic activity to achieve mandated $NO_x$ reduction levels, and for lowering the combustion temperature of the soot fraction trapped on the filter. Achieving adequate levels of SCR catalyst compositions on the soot filter is also important to secure adequate durability for the catalyst. Over extended use of the emissions treatment system, catalysts are invariably exposed to various levels of catalyst poisons that may be derived through break down of lubricating oils, or may arise from impurities in the diesel fuel. Examples of such catalyst poisons include phosphorus, zinc, alkali metals and alkaline earth metals. Higher levels of catalyst compositions are therefore typically deposited on catalyst substrates to overcome the inevitable loss of catalytic activity.

Figure 1A:
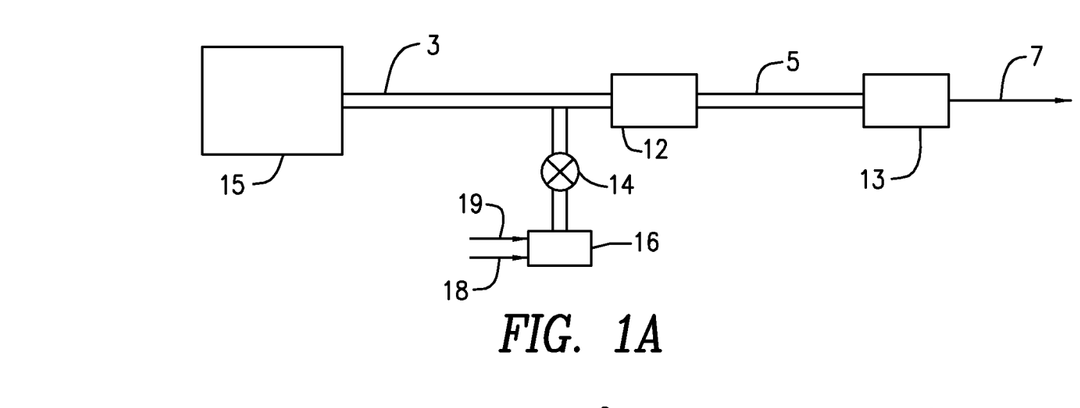
FIG. 1A is a schematic depiction of one embodiment of the emissions treatment system according to the present invention.

One embodiment of the inventive emission treatment system is schematically depicted in FIG. 1A. As seen, the exhaust gas stream containing gaseous pollutants (including unburned hydrocarbons, carbon monoxide and $NO_x$) and particulate matter from the engine 15 is introduced into the system. A reductant such as hydrocarbons, ammonia or any ammonia precursor (e.g., urea) or any other material showing a sufficient high reduction potential to facilitate the SCR reaction is injected as a spray via a nozzle (not shown) into the exhaust stream. Aqueous urea shown on one line 18 can serve as an ammonia precursor which can be mixed with air on another line 19 in a mixing station 16. Valve 14 can be used to meter precise amounts of aqueous urea which are converted in the exhaust stream to ammonia. The exhaust stream with the added reductant is conveyed to the particulate filter 12 containing a first SCR catalyst. On passing through the particulate filter 12, the $NO_x$ component is converted through the selective catalytic reduction of $NO_x$ with ammonia to nitrogen. There is no intervening SCR catalyst disposed between the engine 15 and the particulate filter 12.

Some of the particulate matter including the soot fraction and the VOF are also removed (about 30 to 60% by mass) by the particulate filter 12. The particulate matter deposited on the particulate filter 12 is combusted through the regeneration of the filter, which is also aided by the presence of the first SCR catalyst. The temperature at which the soot fraction of the particulate matter combusts is lowered by the presence of the catalyst composition disposed on the particulate filter 12.

Upon exiting the particulate filter 12, the gas stream then passes through a substrate 13 containing a second SCR catalyst. The substrate 13 may be a flow through substrate and is disposed downstream of the particulate filter 12. The gas stream exiting the engine 15 contains an initial $NO_x$ concentration at location 3 before entering the particulate filter 12, an intermediate $NO_x$ concentration at location 5 between the particulate filter 12 and the downstream substrate 13, and a final $NO_x$ concentration at location 7 after passing through the flow through substrate 13. System conversion of $NO_x$ attained in the gas stream based on the initial $NO_x$ concentration and the final $NO_x$ concentration is greater than about 50%. The $NO_x$ conversion by the particulate filter 12 is in the range of about 10% to about 90% of the system $NO_x$ conversion integrally measured over a test driving cycle (see http://www.epa.gov/nvfel/testing/dynamometer.htm for a description of test driving cycles) or under simulated reactor conditions By traveling through the emissions treatment system herein described, the gas stream causes the back pressure of the system to increase by less than about 25%. The system back pressure increase is determined relative to the back pressure increase resulting from passing the gas stream through an uncoated filter. System back pressure is measured by an average of cold flow values at a space velocity, equal to the volumetric flow rate of the gas stream divided by the system volume, of between 20,000 $h^{-1}$ and 120,000 $h^{-1}$.

The emissions treatment system of the present invention allows for operation inside a window defined by a minimum targeted system $NO_x$ concentration and a maximum targeted percentage increase in system back pressure. This operational window provides a range in which high $NO_x$ conversion may be realized without causing an excessive and highly undesirable back pressure increase. In one embodiment, the minimum targeted system $NO_x$ conversion is about 50% over the test cycle and the maximum targeted percentage increase in system back pressure over an uncoated partial filter is about 25%. Clearly, other minimum targeted system $NO_x$ concentrations and maximum targeted percentage increase in system back pressure can also be established.

Suitable SCR catalyst compositions for use in the system are able to effectively catalyze the reduction of the $NO_x$ component at temperatures below 600° C., so that adequate $NO_x$ levels can be treated even under conditions of low load which typically are associated with lower exhaust temperatures. Preferably, the catalyst article is capable of converting at least 50% of the $NO_x$ component to $N_2$, depending on the amount of reductant added to the system. In addition, SCR catalyst compositions for use in the system are also ideally able to aid in the regeneration of the filter by lowering the temperature at which the soot fraction of the particulate matter is combusted. Another desirable attribute for the composition is that it possesses the ability to catalyze the reaction of $O_2$ with any excess $NH_3$ to $N_2$ and $H_2O$, so that $NH_3$ is not emitted to the atmosphere. In certain embodiments of the system, the first SCR catalyst and/or the second SCR catalyst can comprise a zeolite having a Cu CHA structure, a mixed oxide of $V_2O_5$, $WO_3$ and $TiO_2$, or a Fe doped zeolite. In one or more embodiments, the SCR catalyst includes a molecular sieve, which may contain a promoter such as Cu, Fe, Mn, Co, Ag and combinations of these materials.

In one or more embodiments, more than one SCR catalyst may be utilized. The compositions of the SCR catalysts can be identical or different. If they are different, the one SCR catalyst may be operable for $NO_x$ conversion at higher gas stream temperatures and other SCR catalyst may be operable for $NO_x$ conversion at lower gas stream temperatures. For example, one SCR catalyst may include a zeolite having a CHA structure and the other SCR catalyst may include a mixed oxide of $V_2O_5$, $WO_3$ and $TiO_2$. In a specific embodiment, one SCR catalyst may include a Fe doped zeolite and the other SCR catalyst may include a mixed oxide of $V_2O_5$, $WO_3$ and $TiO_2$. In more specific embodiment, one SCR catalyst may include a Fe doped zeolite and the other SCR catalyst includes a zeolite having a CHA structure.

Useful SCR catalyst compositions used in the inventive system also have thermal resistance to temperatures greater than 650° C. Such high temperatures are often encountered during the regeneration of particulate filters. SCR catalyst compositions should also resist degradation upon exposure to sulfur components, which are often present in diesel exhaust gas compositions. The first SCR catalyst is chosen to provide a system $NO_x$ conversion of at least about 10% at 250° C. and a space velocity of about 40,000 $h^{-1}$. Preferably, the first SCR catalyst is chosen to provide a system $NO_x$ conversion of at least about 50% under these same conditions.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations.

Zeolites and molecular sieves used in such compositions are resistant to sulfur poisoning, sustain a high level of activity for the SCR process, and are capable of oxidation of excess ammonia with oxygen. These zeolites have pore size large enough to permit adequate movement of the reactant molecules NO and $NH_3$ into, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". According to one or more embodiments, zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant $NO_x$ and $NH_3$ molecules and reactant $NH_3$ and $O_2$ molecules. Any zeolites meeting the foregoing criteria are suitable for use in the practices of the present invention; specific zeolites which meet these criteria are USY, Beta and ZSM-20. Other molecular sieves may also satisfy the aforementioned criteria.

When deposited on the particulate filter substrates, such SCR catalyst compositions are deposited at concentrations greater than about 0.1 $g/in^3$ and less than about 3.5 $g/in^3$ to ensure that the desired $NO_x$ reduction and particulate removal levels are achieved and to secure adequate durability of the catalyst over extended use.

Figure 1B:
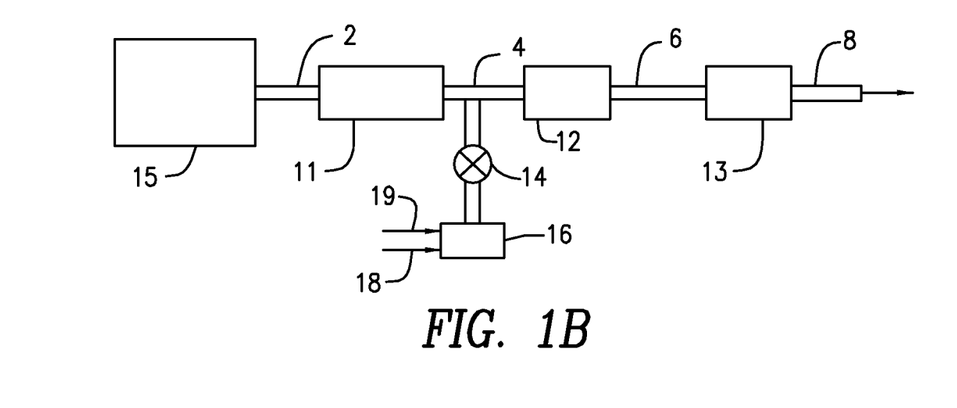
FIG. 1B is a schematic depiction of another embodiment of the emissions treatment system according to the present invention.

In an alternative embodiment of the emissions treatment system, as illustrated in FIG. 1B, an oxidation catalyst 11 located upstream of the particulate filter 12. In FIG. 1B, the gas stream exiting the engine 15 contains a first $NO_x$ concentration at location 2 before entering oxidation catalyst 11, a second $NO_x$ concentration at location 4 between the oxidation catalyst 11 and the particulate filter 12, a third NOx concentration at location 6 after passing through the particulate filter 12 and entering the downstream substrate 13, and a final $NO_x$ concentration at location 8 after passing through the downstream substrate 13.

In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the particulate filter 12 (i.e., clogging), which is positioned downstream in the system. In addition, a substantial proportion of the NO of the $NO_x$ component is oxidized to $NO_2$ in the oxidation catalyst. The increased proportion of $NO_2$ in the $NO_x$ due to the catalytic action of the upstream oxidation catalyst facilitates the reduction of the $NO_x$ as compared to exhaust streams containing smaller proportions of $NO_2$ in the $NO_x$ component.

The oxidation catalyst 11 can be formed from any composition that provides effective combustion of unburned gaseous and non-volatile hydrocarbons (i.e., the VOF) and carbon monoxide. In addition, the oxidation catalyst should be effective to convert a substantial proportion of the NO of the $NO_x$ component to $NO_2$. As used herein, the term "substantial conversion of NO of the $NO_x$ component to $NO_2$" means a conversion of NO and $NO_2$ to $N_2$ of at least about 5% or at least about 10% or at least about 20%, and specifically of at least about 30% and more specifically of at least 60% over the driving cycle. Catalyst compositions having these properties are known in the art, and include platinum group metal- and base metal-based compositions. The catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal. Preferably, the oxidation catalyst removes some of the particulate matter from the exhaust stream upstream of the filter, since the reduction in the particulate mass on the filter potentially extends the time before forced regenerations.

One preferred oxidation catalyst composition that may be used in the emission treatment system contains a platinum group component (e.g., platinum, palladium or rhodium components) dispersed on a high surface area, refractory oxide support (e.g., gamma-alumina) which is combined with a zeolite component (preferably a beta zeolite). A preferred platinum group metal component is platinum. When the composition is disposed on a refractory oxide substrate, e.g., a flow through honeycomb substrate, the concentration of platinum is typically from about 10 to 120 $g/ft^3$ of platinum.

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide with an atomic ratio between the platinum group metal and the alkaline earth metal of about 1:250 to about 1:1, and preferably about 1:60 to about 1:6.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 $m^2/g$ and consist essentially of a bulk second metal oxide which may be one or more of titania, zirconia, ceria-zirconia, silica, alumina-silica, and alpha-alumina.

Also useful are the catalyst compositions disclosed in U.S. Pat. No. 5,462,907 (the '907 patent, the disclosure of which is hereby incorporated by reference). The '907 patent teaches compositions that include a catalytic material containing ceria and alumina each having a surface area of at least about 10 $m^2/g$, for example, ceria and activated alumina in a weight ratio of from about 1.5:1 to 1:1.5. Optionally, platinum may be included in the compositions described in the '907 patent in amounts effective to promote gas phase oxidation of CO and unburned hydrocarbons but which are limited to preclude excessive oxidation of SO to $SO_2$. Alternatively, palladium in any desired amount may be included in the catalytic material.

In a third embodiment of an emissions treatment system (not shown) where an oxidation catalyst 11 is located upstream of the SCR loaded particulate filter 12 without any additional downstream SCR containing component.

Figure 2:
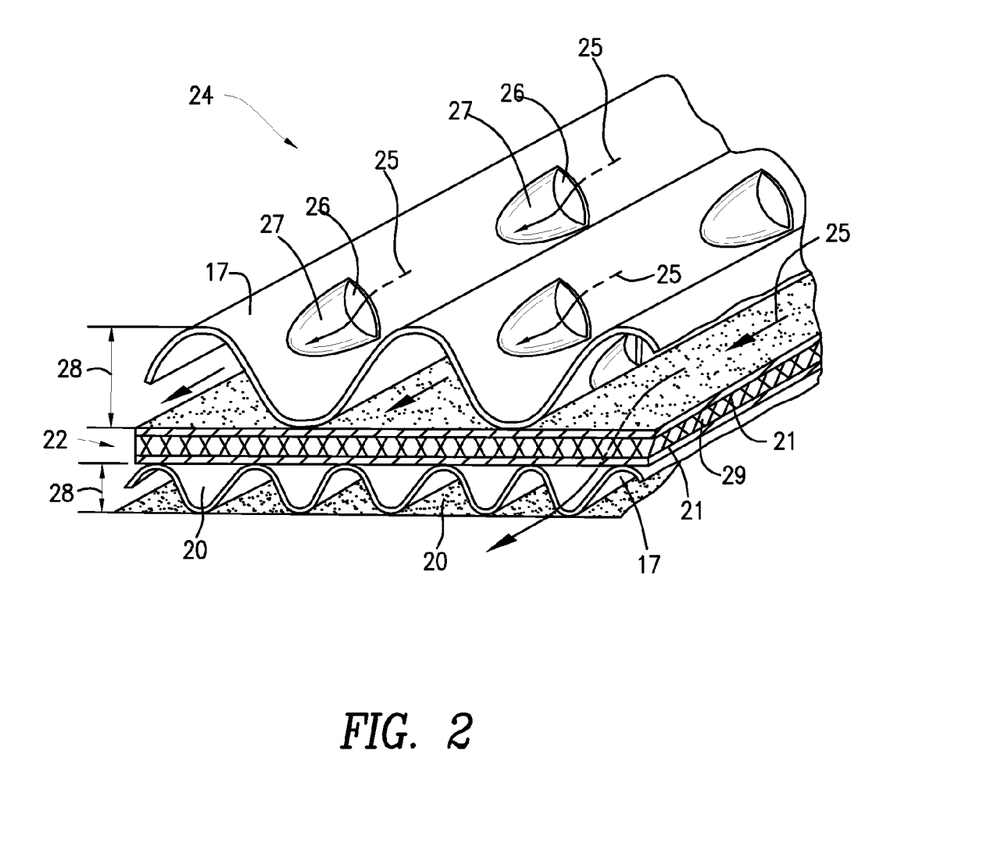
FIG. 2 is an enlarged fragmentary perspective view of one embodiment of a particulate filter used in the emissions treatment system according to the present invention.

FIG. 2 provides a diagrammatic and perspective illustration of an embodiment of the particulate filter 24 according to one embodiment of the invention. The particulate filter 24 includes partitions 17, between which a filter assembly 22 according to the invention is disposed in each case. In this embodiment, the filter assembly 22 is formed with two covering layers 21 and a fiber layer 29 disposed there between, although the connection by technical joining in the boundary region cannot be seen due to the sectional illustration. The partitions 17 in this case are provided with a structure, whereas the filter assembly 22 has a substantially smooth surface. This structure of the partitions 17 forms passages 20 through which an exhaust gas can flow in the flow direction 25. The partitions 17 in this case have different heights 28 of the structure so that the passages 20 which are formed are matched to the characteristics of the incoming flow of exhaust gas.

The embodiment illustrated herein substantially shows an open filter. This property is described by the fact that there is a freedom of flow of at least 20%. In this context, the term "freedom of flow" means that in any desired cross section it is possible to see through at least 20% of the area, i.e. at least 20% of the area is free of internal fittings, such as diverting surfaces 27 or the like. In other words, this also means that when a particulate filter of this type is viewed from the end side, it is possible to see through at least some of the passage provided that the internal fittings are all in the same position, i.e. are aligned one behind the other. This is typically the case with honeycomb bodies made from at least partially structured sheet-metal layers. However, the freedom of flow, in the case of internal fittings which are not aligned with one another, does not necessarily mean that it is actually possible to see through part of a honeycomb body of this type. The partitions 17 are provided with apertures 26 and the diverting surfaces 27 which divert the gas stream toward the filter assembly 22. This produces pressure differences which cause partial flows of exhaust gas to penetrate through the filter assembly 22 so that soot particulates or the like remain and accumulate in the fiber layer 29.

Figure 3:
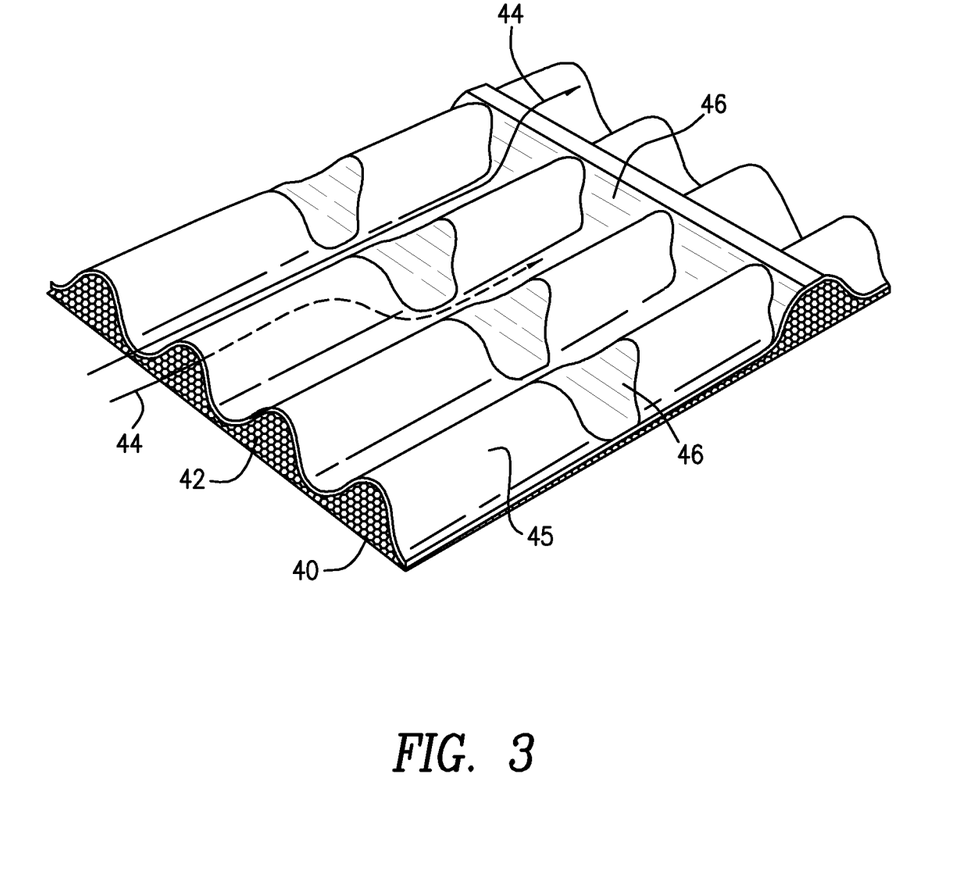
FIG. 3 is a perspective view of another embodiment of a particulate filter used in the emissions treatment system according to the present invention.

FIG. 3 shows a slightly different configuration of a filter body according to the invention. In this case too, the passages 42 are substantially generated by a corresponding structure of the partitions 45. Furthermore, the partitions 45 have diverting surfaces 46 which close off the entire cross section of the passages 42. The result of this is that the flow direction 44 of the exhaust gas is influenced in such a manner that the particulate-containing exhaust gas is guided through the filter assembly 40. This configuration is mainly suitable for applications in which a pressure loss is not critical. In the case of mobile exhaust systems, according to current knowledge, it is preferable to use an open filter with passages 42 which are just constricted but are not closed off. Depending on the number of diverting surfaces 46 which the exhaust gas is to pass through and/or the flow through a filter assembly 40, ultimately substantially the entire gas stream is filtered and purified even in the case of an open filter body 12, as illustrated in FIG. 2.

Figure 4A:
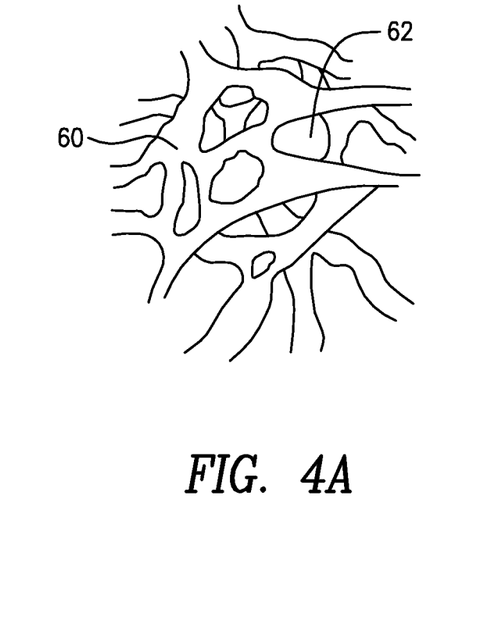
FIGS. 4A and 4B are views of another embodiment of a particulate filter used in the emissions treatment system according to the present invention.
Figure 4B:
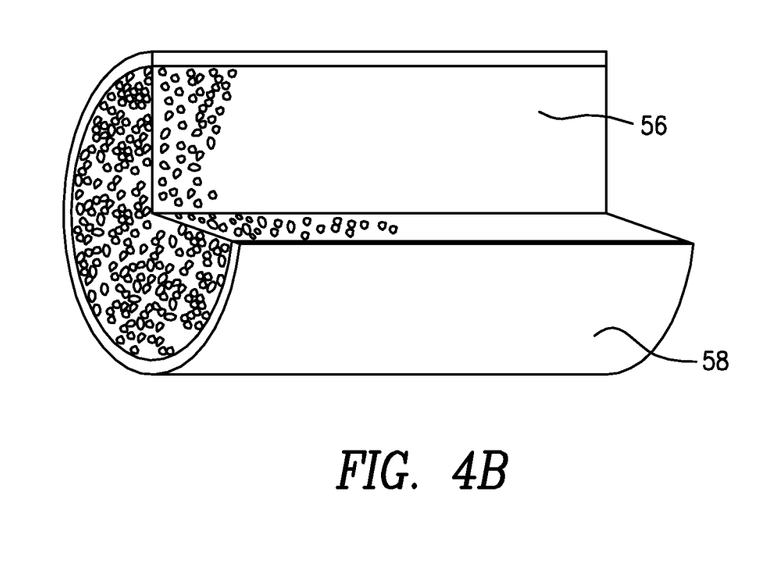

One form of partial filter that can be used is a foam filter as illustrated in FIGS. 4A and 4B, which may be metallic, ceramic or any other suitable material suitable for engine exhaust systems. In a specific embodiment, the foam filter is a metallic foam filter, and the metallic foam filter according to one embodiment of the present invention forms an open or reticulated substrate structure comprising metallic cells or pores and struts forming cellular walls, see FIG. 4B. The metallic foam substrate can be further described as a porous matrix having a plurality of irregularly shaped passages wherein exhaust gases undergo multiple random twists and turns in traveling from the upstream side to the downstream side of the filter, see FIG. 4A. This turbulent or tortuous flow path is defined by numerous apertures, pores, channels or similar structural features that cause liquid and/or gas to flow there through in turbulent or substantially non-laminar fashion and give the substrate a high surface area per overall volume of the flow path of the fluid through the substrate, e.g., features that create a high mass transfer zone for the fluid therein. In contrast, a dense substrate, such as a plate, tube, foil and the like, it has a relatively small surface area per overall volume of the flow path through the substrate regardless of whether it is perforated or not, and do not substantially disrupt laminar flow therethrough. The open or reticulated substrate structure of the metallic foam, importantly not only provides a high mass transfer zone, but such open structure keeps backpressure low. The metallic foam filter of the present invention may be more readily appreciated by reference again to FIG. 4A, which depicts a schematic perspective view of a metallic foam filter, and FIG. 4B, which depicts an enlarged schematic fragmental view of the three-dimensional network of the metallic foam filter, both intended as non-limiting embodiments of the invention. Referring to FIGS. 4A and 4B, a metallic foam filter 56 is housed within a housing unit 58. The schematic shows an open network of metallic struts to provide walls 60 and pores 62, which makes up a torturous pathway for an air inlet stream.

Since these metallic foam structures have higher surface areas than dense substrates and since they permit fluid flow therethrough, they are well-suited for use in preparing filter members for the trapping of liquid- or gas-borne materials. Furthermore, the high surface area provides for improved mass transfer of active species thereby improving the efficiency of the metallic foam as a catalyst carrier. Methods for making foamed metal are known in the art, see e.g., U.S. Pat. No. 3,111,396, which is incorporated herein by reference, and the use of foamed metal as a carrier for a catalytic material has been suggested in the art, see e.g., SAE Technical Paper 971032, entitled "A New Catalyst Support Structure For Automotive Catalytic Converters" by Arums D. Jatkar, which was presented at the International Congress and Exposition, Detroit, Mich., Feb. 24-27, 1997.

Metallic foams can be characterized in various ways, some of which relate to the properties of the initial organic matrix about which the metal is disposed. Some characteristics of foamed metal substrates recognized in the art include cell size, density, free volume, and specific surface area. For example, the surface area may be 1500 times that of a solid substrate having the same dimensions as the foamed substrate. Foamed metal substrates useful as carriers for catalyst members may have mean cell diameters in the range of 0.5 to 5 mm, and they may have a free volume of from about 80 to 98%, e.g., 3 to 15 percent of the volume occupied by the foamed substrate may constitute metal. The porosity of the substrate may range from 3 to 100 pores per inch (ppi), e.g., from 30 to 90 ppi, or from 40 to 70 ppi. In an illustrative range of 10 to 80 ppi, other characteristics such as cells per square inch may range from 100 to 6400 and the approximate web diameter may vary from 0.01 inch to 0.004 inch. Such foams may have open-cell reticulated structures, based on a reticulated/interconnected web precursor. They typically have surface areas that increase with porosity in the range of from about 700 square meters per cubic foot of foam ($m^2/ft^3$) at about 10 ppi to 4000 $m^2/ft^3$ at about 60 ppi, etc. Other suitable metallic foamed substrates have surface areas ranging from about 200 square feet per cubic foot of foamed metal ($ft^2/ft^3$) at about 10 ppi to about 1900 $ft^2/ft^3$ at about 80 ppi. They may have volume densities in the range of 0.1 to 1 grams per cubic centimeter (g/cc), 0.1 to 0.3 g/cc is also exemplified. Metallic foamed substrates can be formed from a variety of metals, including iron, titanium, tantalum, tungsten, noble metals, common sinterable metals such as copper, nickel, bronze, etc., aluminum, zirconium, etc., and combinations and alloys thereof such as titanium aluminum alloys, steel, stainless steel, Hastelloy, Ni/Cr, Inconel (Ni/Cr/Fe), Monel (Ni/Cu), and FeCrAlloy (Fe/Cr/Al/Yt).

Another form of partial filter that can be used is based on coated metal mesh. Thus individual layers of woven mesh on which a catalyst is disposed can be stacked to form a three dimensional structure. This stack of coated metal mesh has some of the same properties as a coated foam structure as described above. The mesh material can be metal or ceramic and can be fabricated by weaving, slitting and expanding, punching or other methods known in the art to produce sheets with open frontal areas in the range of about 30 to 90%. Such sheets can also be bent or corrugated before or after coating to form three dimensional layered structures. Stacking of corrugated and uncorrugated sheets can be used to enhance the flow characteristics of the resulting three dimensional stacked structures.

The porous filter used in this invention is catalyzed in that the wall of said element has thereon or contained therein one or more catalytic materials. Catalytic materials may be present on the surfaces of the filtering elements, on the surface of the diverting elements of the filter, imbedded into the surfaces of the filter element or the filter itself may consist all, or in part, of the catalytic material. This invention includes the use of one or more layers of catalytic materials and combinations of one or more layers of catalytic materials on surface of the filter element, imbedded into the surface or comprising the filter element in part or in whole.

To coat the partial filter substrates with the SCR catalyst composition, the substrates are immersed vertically in a portion of the catalyst slurry such that the top of the substrate is located just above the surface of the slurry. The sample is left in the slurry for about 30 seconds. The substrate is removed from the slurry, and excess slurry is removed from the substrate first by allowing it to drain from the part, then by blowing with compressed air (against the direction of slurry penetration). By using this technique, the catalyst slurry permeates the substrate and coats onto all of the internal surface of the filter but does not plug the gas flow channels in the filter to the extent that undue back pressure will build up in the finished substrate.

The coated substrates are dried typically at about 100° C. and calcined at a higher temperature (e.g., 300° C. to 450° C.). After calcining, the catalyst loading can determined be through calculation of the coated and uncoated weights of the substrate. As will be apparent to those of skill in the art, the catalyst, loading can be modified by altering the solids content of the coating slurry. Alternatively, repeated immersions of the substrate in the coating slurry can be conducted, followed by removal of the excess slurry as described above.

EXAMPLES

Comparative Example 1

SCR coating on a wall flow filter substrate SCR catalyst was loaded on a 65% porosity cordierite filter core measuring 1" diameter by 3" length. Thus, a metal exchanged alumino silicate zeolite having a beta structure, i.e. Fe-beta, catalyst powder was mixed with water and milled so that 90% of the particles had a diameter of less than 10 microns (i.e. D90<10 μm). The resulting slurry was diluted to 20% solids by weight. The filter core was dipped into the slurry until it was completely immersed and then removed to drain the excess slurry followed by blowing with compressed air to remove slurry from the walls. After all the excess slurry was removed from the walls and the channels, the part was dried under flowing air at 120° C. for 30 minutes. The dried sample was then calcined in static air for 1 hour at 450° C. The resulting catalyst loading on the part was 0.76 $g/in^3$. Pressure drop measurements were taken prior to and after coating using a Superflow® flowbench. The flow was measured at 4, 6, 8, 10, 12, and 15 inches of water prior to coating and again after coating. The reduction in flow was recorded and then averaged to give a single backpressure increase with coating of 1.0%. After coating, the sample was aged at 750° C. for 5 hrs under a flow of air with 10% steam. SCR performance of the coated sample was measured in a quartz lined reactor with a gas feed comprising 500 ppm NO, 500 ppm $NH_3$, 5% $H_2O$, 10% $O_2$, and balance $N_2$. The total flow gas flow through the sample was 22.5 L resulting in an hourly gas space velocity of approximately 37,000 $hr^{-1}$. The sample's SCR catalytic activity was tested by stabilizing at 200° C. for 15 minutes and then measuring the downstream NO, a $NO_2$, $N_2O$ and $NH_3$ gas concentrations with an FTIR. The gas concentrations were then taken at 250, 300, 350, and 450° C. in the same manner. The sample's "NOx" conversion was thus recorded as a % reduction in NO concentration at each temperature point and is given in table 1 below.

TABLE 1

| NOx conversion of SCR on a 65% porosity cordierite filter | | | | | |
|---|---|---|---|---|---|
| | Temperature | | | | |
| | 200 | 250 | 300 | 350 | 450 |
| NOx conversion (%) | 13.5 | 29.4 | 62.9 | 83.6 | 85.7 |

Example 2

Catalyst Coating of SCR on Metal Foam Based Partial Filter Cores

Using the methods of example 1, a series of samples was created by loading 95% porosity metal foam disks, 1" in diameter by 1" thick, with an SCR catalyst of Fe beta using a 30.5% solids slurry. Thus, 95% porosity FeCrAlloy metal foams of 40 or 50 pores per inch (ppi) pore density were coated with catalyst, dried and calcined to yield catalyst loadings of 0.7 to 0.9 $g/in^3$. The backpressure increase and SCR catalytic performance were measured for three 1"

diameter, 1" thick samples placed in series to form a 1"×3" set. The SCR activity of the set was in the same method as Example 1. The results of the activity are given in table 2 below. The backpressure increase of the coated set of three samples was measured for the individual pieces and averaged to give a back pressure increase on coating of approximately 11%.

TABLE 2

$NO_x$ conversion of SCR on a 50 ppi, 95% porosity metal foam filter

| | Temperature | | | |
|---|---|---|---|---|
| | 200 | 250 | 300 | 450 |
| $NO_x$ conversion (%) | 2.2 | 12.7 | 36.5 | 87.2 |

In spite of the lower conversion of the SCR on partial filter sample in Example 2 above, it provides adequate conversion for a partial filter based system that would have additional advantages as outlined above. Namely, as long as adequate conversion and particulate conversion can be achieved, the reduction in thermal load and frequency of regeneration events as well as the reduction in ash accumulation for the system is advantageous.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

The invention claimed is:

1. A catalytic article for use in a system for treating an engine exhaust gas stream containing an initial $NO_x$ concentration and particulate matter, the gas stream producing a system back pressure and a system $NO_x$ conversion, the catalytic article comprising:
    a particulate filter comprising a first SCR catalyst effective for $NO_x$ conversion, the particulate filter having a particle filtration efficiency in the range of about 30% to 60% by mass and having a catalyst loading in the range of about 0.5 g/in$^3$ and 3.5 g/in$^3$, wherein the particulate filter comprises a foam having an open or reticulated structure comprising cells and struts forming cellular walls, the foam defining a tortuous flow path for the engine exhaust gas stream and having a porosity between 50% and 95%.

2. The catalytic article of claim 1, wherein the particulate filter has an axial length and the SCR catalyst is disposed on a zone extending less than the full axial length of the filter.

3. The catalytic article of claim 1, wherein the SCR catalyst comprises a zeolite having a CHA structure.

4. The catalytic article of claim 1, wherein the SCR catalyst comprises a molecular sieve containing at least one of Cu, Fe, Mn, Co, Ag and combinations thereof.

5. The catalytic article of claim 1, wherein the particulate filter comprises a metal foam.

6. The catalytic article of claim 1, wherein the SCR catalyst loading is in the range of about 0.5 g/in$^3$ to 2.0 g/in$^3$.

7. A diesel engine emissions treatment system comprising the catalytic article of claim 1 downstream from an engine, and further comprising an oxidation catalyst disposed upstream of the particulate filter.

8. The emissions treatment system of claim 7, wherein there is no intervening SCR catalyst disposed between the engine and the particulate filter.

9. The emissions treatment system of claim 7, wherein the first SCR catalyst provides a $NO_x$ conversion of at least about 10% at 250° C. and a space velocity of about 40,000 h$^{-1}$ when tested in a gas stream that comprises about 500 ppm NO, about 500 ppm $NH_3$ and about 5% water in air.

10. An emissions treatment system comprising the catalytic article of claim 1, and a flow through substrate loaded with a second SCR catalyst effective for $NO_x$ conversion disposed downstream of the particulate filter, wherein conversion of $NO_x$ by the particulate filter is in the range of about 10% to 100% of the system total $NO_x$ conversion.

11. The emissions treatment system of claim 10, further comprising an oxidation catalyst disposed upstream of the particulate filter.

12. The emissions treatment system of claim 10, wherein the first SCR catalyst provides a NO conversion of at least about 10% at 250° C. and a space velocity of about 40,000 h$^{-1}$ when tested in a gas stream that comprises about 500 ppm NO, about 500 ppm $NH_3$ and about 5% water in air.

13. The catalytic article of claim 1, wherein the foam has a porosity between 60% and 95%.

14. The catalytic article of claim 1, wherein the cells have a mean cell diameter in the range of 0.5 to 5 mm.

15. The catalytic article of claim 1, wherein the foam has a pores per inch ranging from 3 to 100.

16. The catalytic article of claim 1, wherein the foam has a pores per inch ranging from 30 to 90.

17. The catalytic article of claim 1, wherein the foam has a pores per inch ranging from 40 to 70.

18. The catalytic article of claim 5, wherein the metal foam comprises a metal selected from the group consisting of iron, titanium, tantalum, tungsten, noble metals, copper, nickel, bronze, aluminum, zirconium, and combinations and alloys thereof.

19. A method of treating an engine exhaust gas stream containing an initial $NO_x$ concentration and effective for conversion of $NO_x$, the gas stream having a system back pressure and a system $NO_x$ conversion, the method comprising:
    passing the engine exhaust gas stream produced by an engine through the catalytic article of claim 1.

20. The method of treating an engine exhaust gas stream of claim 19, wherein there is no intervening SCR catalyst disposed between the engine and the catalytic article.

21. The method of treating an engine exhaust gas stream of claim 19, wherein a gas stream having an intermediate $NO_x$ concentration is produced by the catalyst article, the method further comprising:

injecting ammonia or an ammonia precursor into the exhaust gas system upstream of the catalyst article; and passing the gas stream having the intermediate $NO_x$ concentration through a second substrate loaded with a second SCR catalyst disposed downstream of the catalyst article.

22. The method of treating an engine exhaust gas stream of claim 21, wherein there is no intervening SCR catalyst disposed between the engine and the particulate filter.

* * * * *